May 21, 1963
C. H. WINTER, JR
3,090,280
MEANS FOR PRODUCING A VISUAL PHENOMENON
FOR INCREASING CONTRAST RATIO
Filed Sept. 2, 1959
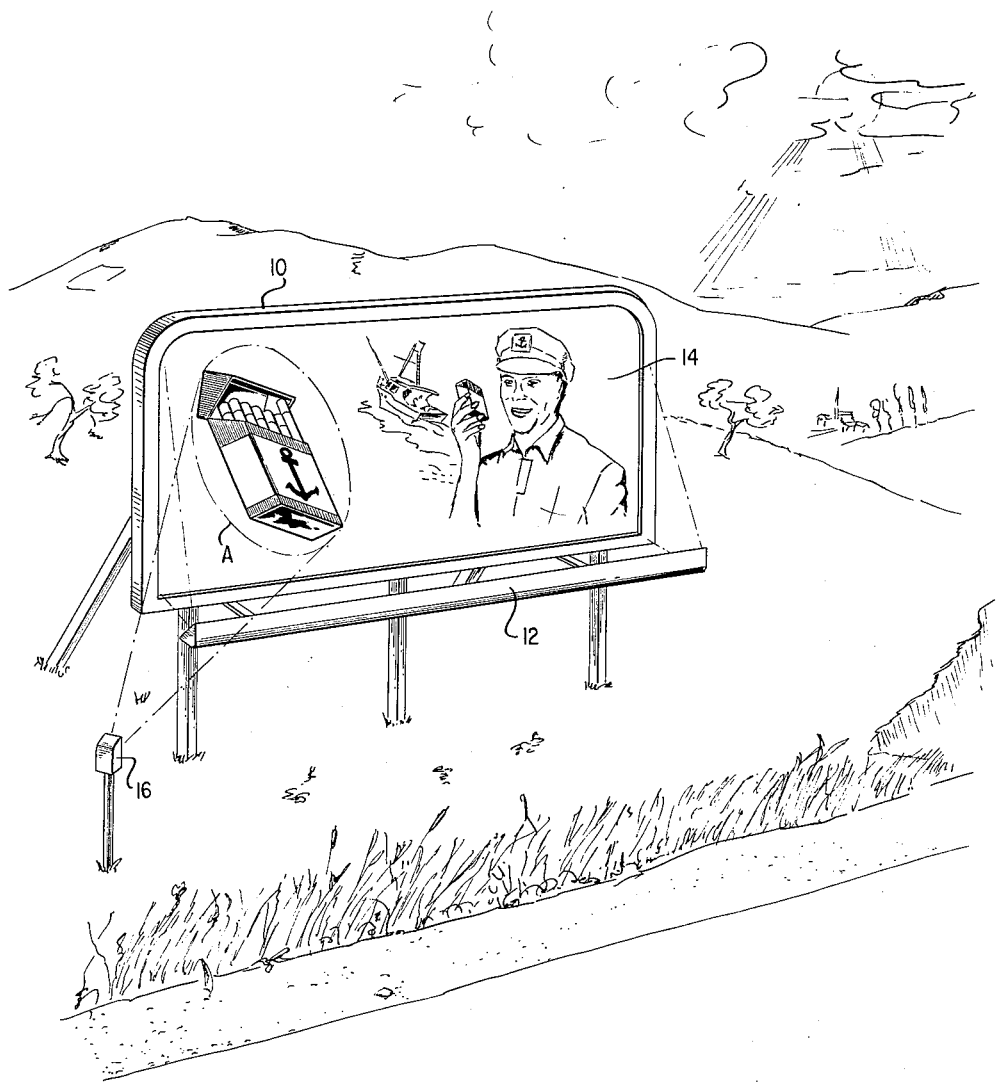
INVENTOR.
CHARLES H. WINTER, JR.
BY
*ATTORNEYS.*

United States Patent Office 3,090,280
Patented May 21, 1963

3,090,280
MEANS FOR PRODUCING A VISUAL PHENOMENON FOR INCREASING CONTRAST RATIO
Charles H. Winter, Jr., 1318 Oberlin Road, Green Acres, Wilmington 3, Del.
Filed Sept. 2, 1959, Ser. No. 837,580
5 Claims. (Cl. 88—24)

This invention relates generally to the display art, and more particularly to displays using projected images to obtain unusual visual effects.

Previously in this art there have been attempts to create unusual effects, such as by the use of various combinations of colored lights which are projected onto a line drawing, painting, or other type of reproduction. Another method employed included the use of a plurality of mirrors mounted in various arrangements depending upon the effect desired.

In recent years unusual effects have been obtained by the use of a double picture covered with a special glass or plastic which permits a viewer to see first one picture and then the other, depending upon the angle of the line of sight with respect to the glass, giving the subject of the pictures the unusual appearance of moving. Other methods in recent use are display arrangements incorporating luminescent pigments and/or glass beads in paint.

These methods have not proved completely effective in their attempts to produce lifelike qualities and vividness in reproductions used in displays. In many of these applications the color appears washed out and any range of contrast is only obtained with the use of extremely bright lights and luminescence which create such glaring effects as to be displeasing to the eyes of a viewer. Furthermore, in all of the prior methods only a flat or two dimensional effect has been obtained.

With all printed and painted surfaces, there is a great limitation upon the contrast ratio or range of light intensities reflected or transmitted to a viewer, which is the main shortcoming of present display arrangements.

With the foregoing defects of the prior art in mind, the primary object of this invention is to produce a visual phenomenon which gives a startling effect because of the unusual vividness and brilliance of color.

Another object of the invention is to provide displays which have amazing lifelike qualities and present a sense or feeling of depth to the display.

A further object of the invention is to provide a method of eliminating, or at least greatly reducing, glare caused by extraneous light.

The foregoing objects and others ancillary thereto are accomplished according to preferred embodiments of the invention by employing an image as a screen and a reproduction of the image is projected thereon and in registry therewith.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, in which the invention is illustrated in a perspective view as embodied in an advertising billboard display.

There are many applications and arrangements of displays which may be used as a part of the present invention, only a small number of which will be detailed. In all embodiments however, the basic principle underlying the startling results obtained appears to be as follows:

Images such as paintings or the like have a limited contrast with respect to the maximum and minimum light reflection or transmission from light to dark areas, respectively. Using any arbitrary units, assume that a brightly illuminated three dimensional object reflects light to a viewer which varies in intensity from one to a thousand units. Assume that a photographic transparency varies in light transmission intensity from one to a hundred units. Further assume that an artist's painting of the same object reflects light which varies in intensity from one to fifty units. It should now be recognized that the painting when illuminated by a projected image of the transparency would reflect light to a viewer varying in intensity from:

Dark area (minimum intensity) 1×1=1
Bright area (maximum intensity) 100×50=5000

Thus a ratio of light intensity five times greater than the original can be produced and can be moderated to any desired extent such as by diluting with light from other sources.

Having set forth the theory and principle behind the invention, some operational modes for carrying out the invention will now be explained.

*Example I*

In one embodiment of the invention, a transparency is made of an object, for example, a photographic portrait. The same image as that of the transparency is permanently reproduced on a screen. In order to obtain a greater sense or feeling of depth, it is preferable to eliminate details from the background of the screen image.

In this event, in the permanent reproduction only the details of the object, i.e., the portrait, in the foreground should be clear and sharp with the background being similar in shade or color to the corresponding background portions of the transparency.

The novel effect of the present invention is obtained by projecting the image of the transparency onto the screen in perfect registry with the permanent reproduction thereon. The superimposed projected image produces a startling effect in that the shades or colors are very vivid, and the portrait is sharp, while the background is softly illuminated thus giving the illusion of depth. With this particular method, unusual effects are also produced by illuminating the painting with a soft focus of the transparency, i.e., slightly out of focus, or slightly out of registry with the portrait. With the use of these techniques, it will be found that the diluting effect of extraneous light falling upon the display is greatly reduced.

In experiments which have been carried out it has been found that by viewing the permanent reproduction alone or the transparency alone, their appearance is quite normal; but, when the two are present together, a startling visual phenomenon is obtained, the superimposed images providing a surprisingly lifelike appearance. In carrying out the experiment in a darkened room the unusual effects were somewhat more pronounced than in an illuminated room. However in a room illuminated by daylight for example, the projected image from the transparency had the unexpected effect of virtually eliminating glare from stray light falling upon the screen, whereas such stray light caused much glare and made it impossible to clearly view the screen reproduction when the transparency image was not projected thereon.

*Example II*

In a second embodiment of the invention, a projection transparency and a matching permanent reproduction are produced from a scene which may be a reproduction from life, a still life or a landscape painting, for example, such scene having areas of great contrast and including heavily shaded areas. The transparency is then projected onto the permanent reproduction in registry therewith. When viewed alone, i.e., without the projected image thereon, the permanent reproduction lacks sharpness of detail, particularly in the heavily shaded areas. However, when the transparency is projected on the permanent reproduction, the multiplication of the light intensity not only emphasizes the contrast between areas but also illuminates details within the heavily shaded areas so that they have a surprisingly lifelike quality.

*Example III*

In another embodiment of the invention a reproduction is made of some type of display such as that employed on the conventional type of billboard, and this reproduction is projected onto the display in registry therewith, whereupon the same startling and unusual effects are obtained, especially after dark or on dull days.

In a commercial application of this invention, the usual type of advertisement display is placed on a billboard and a station is set up from which a photograph is taken of the billboard. A transparency is prepared from this photograph, and from this station the transparency is projected onto the billboard. This completely eliminates the need for external lighting to illuminate the billboard at night since the light from the projected transparency is sufficient. In this type of display, if a very bright light is used in the projector, then the diluting effect of the headlights of the car will be obviated and the display will remain brilliant in color regardless of the light conditions in the general vicinity.

Referring now to the drawing, a slight variation of Example III, described above, is illustrated wherein an advertising billboard 10, of conventional type, illuminated by sunlight and fluorescent or other conventional lamps housed in a trough 12. The image or advertising poster 14 is thus usually overall illuminated by cloud filtered sunlight during the day and conventional lighting at night. A portion of the image, A, which it may be desired to highlight by accentuating the brilliance and contrast, may additionally be illuminated day and night by a beam from projector 16 passed through a positive transparency of said portion, the negative of the transparency having been preferably photographed from the same position as the projector.

*Example IV*

A further embodiment of the invention is to provide an image, display or the like on a translucent screen such as a large sheet of ground glass and a transparency of such image or display projected thereon, whereupon, when viewed from either side of the translucent screen the unusual visual phenomenon may be seen.

*Example V*

Any of the preceding examples may be used in order to increase the contrast and vividness of a dull image. If it is desired to obtain a brilliant photographic reproduction of a dull image, a reproduction of the image should be projected onto the image in registry therewith. This has the effect of adding brilliance to an otherwise dull image. Then, a photograph is taken of the image and the projected reproduction. This photograph of the original image will be more vivid and have greater contrast than the original.

The word "image" as used in the preceding specification and the following claims refers to any subject, reproduction, or facsimile, colored or black and white, and is not to be considered as limited to an image of the projected or reflected type as the term is used in the field of optics.

It should be readily recognized by those skilled in the art that these are but a small number of numerous applications of the present invention and are not to be construed as limitations. The application of this invention will find great use in the field of indoor exhibits, outdoor billboards, or any other type of display and advertising or other purposes.

Although certain specific embodiments of the invention have been described, it is obvious that many modifications thereof are possible insofar as is necessitated by the prior art and by the spirit of the appended claims.

What is claimed as new is:

1. A display adapted to attract visual observation comprising a surface having an image of a subject formed thereon, said surface and image being overall illuminated by a first light source, and a replica of at least a portion of the same image projected by a second light source onto the surface in substantially exact registry with the said portion of the image during the entire period of time that the display is to be visually observed and while said image is illuminated by the first light source, said replica being obtained by photographing the corresponding portion of one of said subject and image from a selected position to obtain a negative and projecting said replica from relatively said selected position onto the image through a positive transparency made from said negative, whereby to markedly improve the vividness of colors, greatly increase the contrast ratio of said portion of the image and greatly reduce surface glare.

2. An illuminated display according to claim 1 wherein said surface is a translucent surface.

3. An advertising display according to claim 1 wherein said first light source comprises daylight.

4. A method for illuminating a display adapted to attract visual observation comprising the steps of providing an image of a subject on a surface, photographing at least a portion of one of said subject and image from a selected position to obtain a negative, converting said negative into a positive transparency, overall illuminating said surface and image by a first light source, placing said transparency in relatively said selected position, and projecting light from a second light source through said positive transparency onto the surface to form a second image substantially in exact registry with the corresponding portion of the image during the entire period of time that the display is to be visually observed and while said image is illuminated by the first light source.

5. An advertising display adapted to attract visual observation comprising a plane surface having an original image formed thereon by pigments such as paints and inks, said surface and image being overall illuminated by a first light source, and a replica of at least a portion of the same image projected by a second light source onto the surface in substantially exact registry with the said portion of the original image during the entire period of time that the display is to be visually observed and while said original image is illuminated by the first light source, said replica being obtained by photographing the said portion of the original image from such a position as to obtain a virtually undistorted picture of said image portion on a negative and projecting said replica from a position substantially coinciding with said position onto the original image through a positive transparency made from said negative, whereby to markedly improve the vividness of colors, greatly increase the contrast ratio of said portion of the original image and greatly reduce surface glare.

References Cited in the file of this patent

UNITED STATES PATENTS

| | | |
|---|---|---|
| 1,102,903 | Gamble | July 7, 1914 |
| 1,456,954 | Von Lucken | May 29, 1923 |
| 1,596,458 | Schiesari | Apr. 17, 1926 |
| 1,869,275 | Planer | July 26, 1932 |
| 2,207,919 | Harrison | July 16, 1940 |
| 2,374,981 | Cooke | May 1, 1945 |

FOREIGN PATENTS

| | | |
|---|---|---|
| 160,512 | Great Britain | Mar. 16, 1921 |